United States Patent
Rowe et al.

(10) Patent No.: US 10,916,942 B2
(45) Date of Patent: *Feb. 9, 2021

(54) METHOD AND APPARATUS FOR INCREASED ENERGY HARVEST IN A MICROGRID

(71) Applicant: Enphase Energy, Inc., Petaluma, CA (US)

(72) Inventors: Christopher Rowe, Old Bar (AU); Donald Richard Zimmanck, Sebastopol, CA (US); Michael J. Harrison, Petaluma, CA (US); Martin Fornage, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/588,252

(22) Filed: Sep. 30, 2019

(65) Prior Publication Data
US 2020/0028362 A1 Jan. 23, 2020

Related U.S. Application Data

(63) Continuation of application No. 15/415,531, filed on Jan. 25, 2017, now Pat. No. 10,431,980.

(60) Provisional application No. 62/286,719, filed on Jan. 25, 2016.

(51) Int. Cl.
*H02J 3/38* (2006.01)
*H02M 5/02* (2006.01)
*H02J 3/16* (2006.01)
*H02J 3/46* (2006.01)

(52) U.S. Cl.
CPC .............. *H02J 3/16* (2013.01); *H02J 3/382* (2013.01); *H02J 3/46* (2013.01); *H02J 3/388* (2020.01); *Y02E 40/30* (2013.01)

(58) Field of Classification Search
CPC ........................................................ H02J 3/16
USPC ............................................................ 307/82
See application file for complete search history.

(56) References Cited

U.S. PATENT DOCUMENTS

| | | | |
|---|---|---|---|
| 10,008,854 | B2 | 6/2018 | Zimmanck |
| 2006/0002157 | A1 | 1/2006 | Petter et al. |
| 2007/0274114 | A1 | 11/2007 | Neacsu |
| 2012/0267952 | A1 | 10/2012 | Ballatine et al. |
| 2016/0241032 | A1 | 8/2016 | Zimmanck et al. |
| 2017/0316135 | A1 | 11/2017 | Johnson et al. |

OTHER PUBLICATIONS

Pogaku et al., "Modeling, Analysis and Testing of Autonomous Operation of an Inverter-Based Microgrid", IEEE Transactions on Power Electronics, vol. 22, Issue 2, pp. 613-625, Mar. 2007.

(Continued)

*Primary Examiner* — David T Welch
(74) *Attorney, Agent, or Firm* — Moser Taboada

(57) ABSTRACT

A method and apparatus for power converter current control. In one embodiment, the method comprises controlling an instantaneous current generated by a power converter that is part of an AC battery such that the power converter appears, from the perspective of an AC line coupled to the power converter, as a virtual AC voltage source in series with a virtual impedance, wherein real and reactive phasor currents for the power converter are indirectly controlled by modifying amplitude and phase of a virtual AC voltage waveform that defines the virtual AC voltage source.

20 Claims, 5 Drawing Sheets

(56) References Cited

OTHER PUBLICATIONS

Brabandere et al., "Control of Microgrids", IEEE Power Engineering Society General Meeting, pp. 8, Jun. 24-28, 2007.

Brabandere et al., "A Voltage and Frequency Droop Control Method for Parallel Inverters", IEEE Transactions on Power Electronics, vol. 22, Issue 4, pp. 1107-1115, Jul. 2007.

Sao et al., "Control and Power Management of Converter Fed Microgrids", IEEE Transactions on Power Systems, vol. 23, Issue 3, pp. 1088-1098, Aug. 2008.

Vasquez et al., "Adaptive Droop Control Applied to Voltage-Source Inverters Operating in Grid-Connected and Islanded Modes", IEEE Transactions on Industrial Electronics, vol. 58, Issue 10, pp. 4088-4096, Oct. 2009.

Majumder et al.; Improvement of Stability and Load Sharing in an Autonomous Microgrid Using Supplementary Droop Control Loop 2010, IEEE Transactions on Power Systems 25(2):796-808 Jun. 2010.

Iyer et al., "A Generalised Computational Method to Determine Stabilny of a Multi-inverter Microgrid", IEEE Transactions on Power Electronics, vol. 25, Issue 9, pp. 2420-2432, Sep. 2010.

Majumder et al., "Droop Control of Converter-Interfaced Microsources in Rural Distributed Generation", IEEE Transactions on Power Delivery, vol. 25, Issue 4, pp. 2768-2778, Oct. 2010.

Yao et al., "Design and Analysis of the Droop Control Method for Parallel Inverters Considering the Impact of the Complex Impedance on the Power Sharing", IEEE Transactions on Industrial Electronics, vol. 58, Issue 2, pp. 575-588, Feb. 2011.

Kim et al., "Mode Adaptive Droop Control With Virtual Output Impedances for an Inverter-Based Flexible AC Microgrid", IEEE Transactions on Power Electronics, vol. 26, Issue 3, pp. 689-701, Mar. 2011.

Rocabert et al., "Control of Power Converters in AC Microgrids", IEEE Transactions on Power Electronics, vol. 27, Issue 11, pp. 4734-4749, Nov. 2012.

METHOD AND APPARATUS FOR INCREASED ENERGY HARVEST IN A MICROGRID

CROSS-REFERENCE TO RELATED APPLICATIONS

This application is a continuation of co-pending U.S. patent application Ser. No. 15/415,531 entitled "Method and Apparatus for Increased Energy Harvest in a Microgrid" and filed Jan. 25, 2017, which claims priority to U.S. Provisional Patent Application No. 62/286,719 entitled "Increased Energy Harvest in a Microgrid" and filed on Jan. 25, 2016. Each of the aforementioned patent applications is herein incorporated in its entirety by reference

BACKGROUND OF THE INVENTION

Field of the Invention

Embodiments of the present disclosure relate generally to energy storage in a microgrid and, more particularly, to operation of AC-coupled energy storage devices in a microgrid.

Description of the Related Art

A conventional microgrid generally comprises at least one energy generator, at least one energy storage device, and at least one energy load. When disconnected from a conventional utility grid, a microgrid can generate power as an intentional island without imposing safety risks on any line workers that may be working on the utility grid.

Droop control is one technique that may be used for operating energy storage and generation resources in a microgrid that is disconnected from the utility grid. Droop control is an industry standard technique for autonomously sharing load among parallel AC generators proportional to their power ratings or operating costs. The technique relies on using small changes in voltage and frequency to dictate changes in real and reactive power levels. The "phase shift virtual impedance droop control" method is a time-domain implementation of droop control by which the converter is controlled to appear as a virtual AC voltage source in series with a virtual impedance, where the virtual AC voltage source has a constant amplitude and is phase-shifted proportional to the error between the measured grid frequency and the nominal grid frequency.

This technique has several advantages including improved dynamic response and harmonic compensation; however, the method loses direct control of real and reactive currents and thus makes it difficult to impose current limits. Current limits are necessary to constrain the converter to a safe or desired operating region. For example, if the virtual source voltage phasor commanded during droop control would result in a real or reactive current phasor that exceeds the maximum capability of the converter, the converter could be damaged or be forced to shut-down. In addition, by not having direct phasor control of the real and reactive currents, a converter cannot be operated with a virtual impedance while grid connected, resulting in disjointed transitions between islanded and grid-connected states.

When sufficient energy is available during microgrid operation, energy storage resources (such as batteries) can be charged based on their droop characteristics. However, the maximum rate of charging for the energy storage resources will be reduced when the energy storage resources are providing reactive power for one or more loads, thereby reducing the economic value.

Therefore, there is a need in the art for an efficient technique for controlling reactive power in AC coupled batteries while ensuring energy harvest.

SUMMARY OF THE INVENTION

Embodiments of the present invention generally relate to controlling AC battery reactive current while charging in a microgrid substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
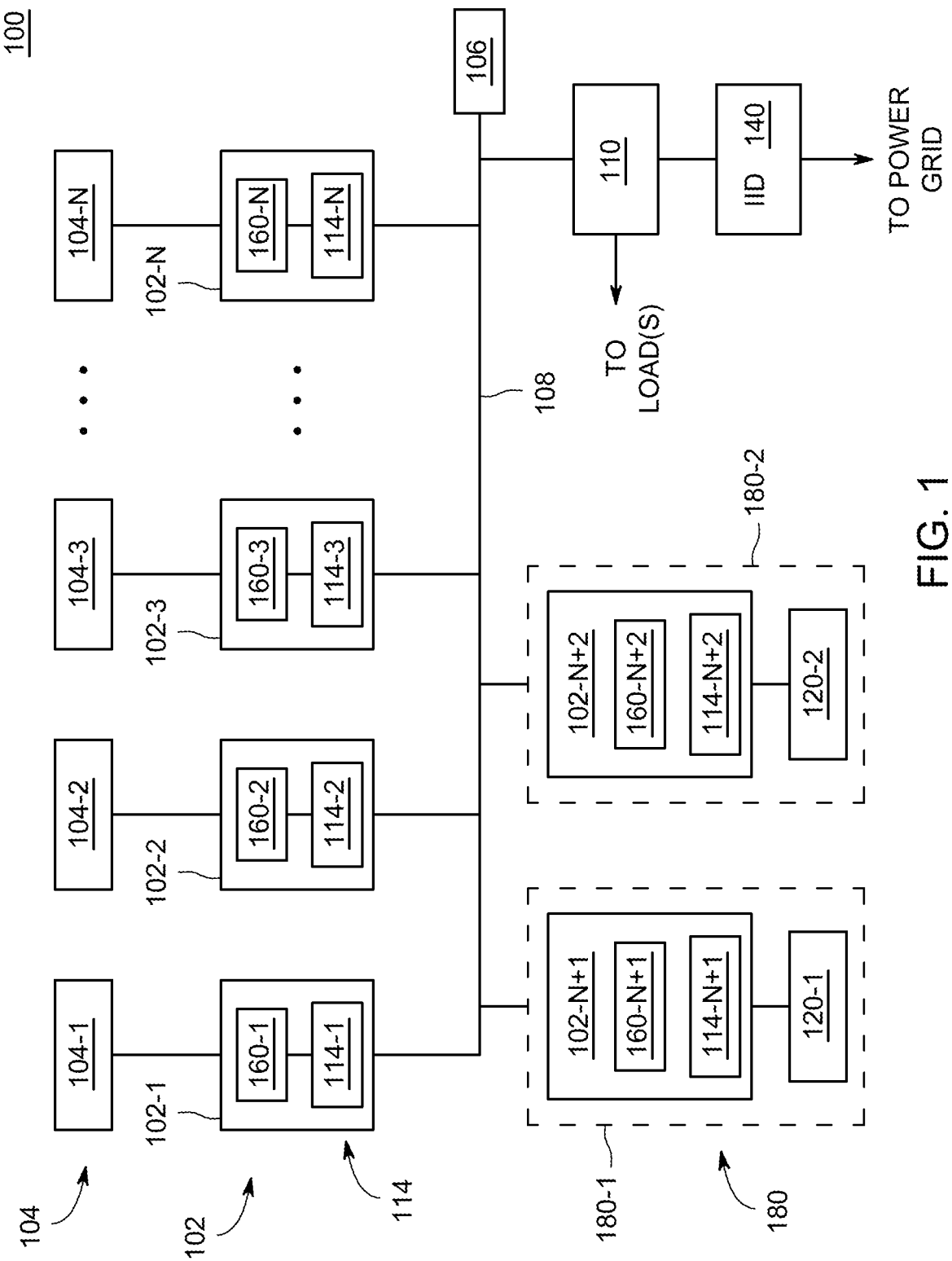
FIG. 1 is a block diagram of a system for power conversion using one or more embodiments of the present invention.

FIG. 1 is a block diagram of a system 100 for power conversion using one or more embodiments of the present invention. This diagram only portrays one variation of the myriad of possible system configurations and devices that may utilize the present invention.

The system 100 is a microgrid that can operate in both an islanded state and in a grid-connected state (i.e., when connected to another power grid (such as one or more other microgrids and/or a commercial power grid). The system 100 comprises a plurality of power converters 102-1, 102-2, 102-3 . . . 102-N, 102-N+1, and 102-N+2 collectively referred to as power converters 102; a plurality of power sources 104-1, 104-2, 104-3 . . . 104-N, collectively referred to as power sources 104; a plurality of energy storage devices 120-1 and 120-2, collectively referred to as energy storage devices 120, a system controller 106; a bus 108; a load center 110; and an island interconnect device (IID) 140 (which may also be referred to as a microgrid interconnect device (MID)). The energy storage devices 120, which may also be referred to energy storage/delivery devices, may be any suitable devices for storing energy and delivering the stored energy as needed, such as rechargeable batteries.

In some embodiments, such as the embodiment described below, the power sources 104 are DC power sources and the power converters 102 are bidirectional converters that can convert DC input power (from the DC power sources 104 and the energy storage devices 120) to AC output power that is coupled to the bus 108, and can convert AC power from the bus 108 to DC output that is stored in the energy storage devices 120 for subsequent use. The DC power sources 104 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power. In other embodiments the power converters 102 may be other types of converters (such as AC-AC matrix converters), and the power sources may be other types of power sources (such as AC power sources).

Each power converter 102-1, 102-2, 102-3 . . . 102-N is coupled to a DC power source 104-1, 104-2, 104-3 . . . 104-N, respectively, in a one-to-one correspondence, although in some other embodiments multiple DC power sources 104 may be coupled to one or more of the power converters 102. The power converters 102-N+1 and 102-N+2 are respectively coupled to energy storage devices 120-1 and 120-2 to form AC batteries 180-1 and 180-2, respectively. The power converters 102-N+1 and 102-N+2 convert power from the bus 108 to energy that is stored in the corresponding energy storage devices 120-1 and 120-2, and convert energy from the energy storage devices 120-1 and 120-2 to power grid compliant AC power that is coupled to the bus 108. Although two AC batteries 180 are depicted in FIG. 1, in other embodiments the system 100 may comprise fewer or more AC batteries 180 (although generally the number of AC batteries 180 and the number of DC sources 104 are such that charging of the AC batteries 180 is a high priority).

Each of the power converters 102-1, 102-2, 102-3 . . . 102-N+2 comprises a corresponding controller 114-1, 114-2, 114-3 . . . 114-N+2 (collectively referred to as controllers 114) for controlling operation of the corresponding power converter 102-1, 102-2, 102-3 . . . 102-N+2, and a corresponding phase lock loop (PLL) 160-1, 160-2, 160-3 . . . 160-N+2 (collectively referred to as PLLs 160). Each PLL 160 receives samples of the voltage on the bus 108 (e.g., from a voltage sampler coupled to the bus 108), generates a signal indicative of the bus voltage waveform (amplitude, phase and frequency), and couples the generated signal to the corresponding controller 114.

The power converters 102 are coupled to the system controller 106 via the bus 108 (which also may be referred to as an AC line or a grid). The system controller 106 generally comprises a CPU coupled to each of support circuits and a memory that comprises a system control module for controlling some operational aspects of the system 100 and/or monitoring the system 100 (e.g., issuing certain command and control instructions to one or more of the power converters 102, collecting data related to the performance of the power converters 102, and the like). The controller 106 is capable of communicating with the power converters 102 by wireless and/or wired communication (e.g., power line communication) for providing certain operative control and/or monitoring of the power converters 102.

In some embodiments, the system controller 106 may be a gateway that receives data (e.g., performance data) from the power converters 102 and communicates (e.g., via the Internet) the data and/or other information to a remote device or system, such as a master controller (not shown). Additionally or alternatively, the gateway may receive information from a remote device or system (not shown) and may communicate the information to the power converters 102 and/or use the information to generate control commands that are issued to the power converters 102.

The power converters 102 are coupled to the load center 110 via the bus 108, and the load center 110 is coupled to the power grid via the IID 140. When coupled to the power grid (e.g., a commercial grid or a larger microgrid) via the IID 140, the system 100 may be referred to as grid-connected; when disconnected from the power grid via the IID 140, the system 100 may be referred to as islanded. The IID 140 determines when to disconnect from/connect to the power grid and performs the disconnection/connection. For example, the IID 140 may detect a grid fluctuation, disturbance or outage and, as a result, disconnect the system 100 from the power grid. Once disconnected from the power grid, the system 100 can continue to generate power as an intentional island, without imposing safety risks on any line workers that may be working on the grid, using the droop control techniques described herein. The IID 140 comprises a disconnect component (e.g., a disconnect relay) for physically disconnecting/connecting the system 100 from/to the power grid. In some embodiments, the IID 140 may additionally comprise an autoformer for coupling the balanced power system 100 to a split-phase load that may have a misbalance in it with some neutral current.

In certain embodiments, the system controller 106 comprises the IID 140 or a portion of the IID 140. For example, the system controller 106 may comprise an islanding module for monitoring the power grid, detecting grid failures and disturbances, determining when to disconnect from/connect to the power grid, and driving a disconnect component accordingly, where the disconnect component may be part of the system controller 106 or, alternatively, separate from the system controller 106. In other embodiments, such as the embodiment depicted in FIG. 1, the IID 140 is separate from the system controller 106 and comprises a disconnect component as well as a CPU and an islanding module for monitoring the power grid, detecting grid failures and disturbances, determining when to disconnect from/connect to the power grid, and driving the disconnect component accordingly. In some embodiments, the IID 140 may coordinate with the system controller 106, e.g., using power line communications. Thus, the disconnection/connection of the system 100 to the power grid is a controlled process driven by the IID 140.

The power converters 102 convert the DC power from the DC power sources 104 and the energy storage devices 120 (when the corresponding AC batteries 180 are discharging) to AC output power and couple the generated output power to the load center 110 via the bus 108. The power is then distributed to one or more loads (for example to one or more appliances) and/or to the power grid (when connected to the power grid); additionally or alternatively, the generated energy may be stored for later use, for example using batteries, heated water, hydro pumping, $H_2O$-to-hydrogen conversion, or the like. Generally the system 100 is coupled to the commercial power grid, although in some embodiments the system 100 is completely separate from the commercial grid and operates as an independent microgrid.

In accordance with one or more embodiments of the present invention, the power converters 102 each employ a virtual voltage-virtual impedance control technique that controls the power converter 102, by controlling the instantaneous current, in such a way as to make the power converter 102 appear (from the perspective of the power grid) as a virtual AC voltage source in series with a virtual impedance as described herein. Although the virtual voltage-virtual impedance technique is generally used for islanded systems, it can also be used when grid-connected so as to enable a seamless transition (i.e., no loss of power) between grid-connected and islanded states. In some alternative embodiments the power converters 102 may employ a different technique for current injection when the system 100 is grid-connected.

Further, during some conditions, such as when the system 100 is operating as a microgrid and sufficient energy is available such that the power converters 102-1 through 102-N are generating power and the AC batteries 180 are operating in a charge mode (i.e., the AC batteries 180 are charging), the AC batteries 180 may still be supplying reactive current as required by one of more loads. In accordance with one or more embodiments of the present invention, the AC battery reactive current levels are minimized during such operating conditions when the AC batteries 180 are being charged at or near their maximum operating current, as described in detail further below. Such limiting of the AC battery reactive current prioritizes active power flow and ensures that the charge rate of the AC batteries 180 is maximized during such operating conditions such that the AC batteries 180 can achieve optimum charging and thereby increase the energy harvest of the system 100. In some alternative embodiments, such prioritization of active power flow may additionally or alternatively be employed during AC battery discharge; as such the AC battery reactive current may also be limited as described herein when the AC batteries 180 are operating in a discharge mode, for example during nighttime in those embodiments where the DC sources 104 are PV modules.

In order to determine when the AC battery reactive current is to be limited, each AC battery's controller 114 (i.e., a droop module of the controller 114 as described below with respect to FIG. 2) compares the AC battery's apparent current—the magnitude of the vector sum of the real (i.e., active) and reactive current components—to a threshold as described in detail further below. If the apparent current exceeds the threshold, a limit is imposed on the AC battery's reactive current. By imposing such a limit, the apparent current is maintained within a desired operating region without adjusting the active current.

When the AC battery reactive current is limited during AC battery charging as described herein, the remaining power converters 102-1 through 102-N support the needed reactive current based on their droop characteristics. For example, in one embodiment where a classic volt-VAR-frequency-Watt droop technique is employed, as the AC battery power converters 102-N+1 and 102-N+2 begin reducing the reactive current they supply, a voltage drop occurs on the bus 108 and the power converters 102-1 through 102-N automatically respond to pick up the voltage drop based on their droop characteristics.

While the techniques described herein allows indirect limiting of phasor current amplitude through strategic modification of the virtual source amplitude and phase, the instantaneous current could exceed limits during transients due to the transient voltage being applied directly across the virtual impedance. For this reason, an instantaneous current limit may also be employed so as to maintain the converter within certain operating constraints even during transients.

During operation, each power converter 102 (i.e., the corresponding control module 114) determines desired real and reactive phasor current values to be generated using a droop technique and also determines desired real and reactive phasor currents to be generated based on one or more current limiting techniques (such as maximum power point tracking (MPPT), one or more economic optimizations (e.g., time of use (TOU)), charge control, advanced grid functions, demand response, prioritizing active power flow when AC batteries 180 are charging, and the like).

Any droop technique where the desired real and reactive phasor currents are determined as a function of grid voltage and frequency may be employed for determining desired real and reactive phasor current values, such as phase-shifted virtual voltage-virtual impedance droop, volt-var-frequency-watt droop, cross-coupled volt-var-frequency-watt droop, non-linear droop, and the like. Droop equations employed by the droop technique used may be offset as needed to achieve desired objectives when the system 100 is grid-connected (for example, to control the net intertie to a residence) as well as when the system 100 is islanded. When the system 100 is disconnected from the power grid (i.e., using the IID 140 or the system controller 106), the droop technique enables parallel operation of the power converters 102 without the need for any common control circuitry or communication between the power converters 102, thereby allowing the power converters 102 to share the load in a reliable manner when disconnected from the power grid.

The desired real and reactive phasor current values determined via the droop technique are compared to one or more real and reactive current thresholds, respectively, obtained via the current limiting techniques. Generally, the desired phasor current values determined from the current limiting techniques are used as the phasor current thresholds, although in other embodiments the thresholds may be determined differently. If one or both of the droop-determined desired phasor current values exceeds the corresponding threshold, it is then limited to a fixed level. For example, one or both of the droop-determined desired phasor currents from a power converter 102 may be greater than the power converter 102 can generate at that time (e.g., if the corresponding DC source 104 is a PV module that is experiencing significant shading) and require a fixed limit to be applied.

When an AC battery 180 is operating in charge mode, the AC battery's desired apparent current—i.e., the magnitude of the vector sum of the real (i.e., active) and reactive current components after limiting has been applied—is compared to a charge threshold for determining whether the desired reactive phasor current value needs to be limited to a particular level as described further below. Such limiting of the desired reactive phasor current prioritizes the active power flow for the AC batteries 180. The resulting controlled real and reactive phasor current values are then used to determine a virtual voltage source waveform for generating the instantaneous current value. The instantaneous current value, which specifies the amount of current to be generated by the power converter 102 at that moment in time, is used to drive power conversion by the power converter 102 such that the power converter 102 emulates a virtual impedance in the time domain while generating an amount of real and reactive current equal to the controlled real and reactive current values. In those embodiments where phase-shifted virtual-voltage-virtual impedance droop is used for determining the desired phasor current values, this technique effectively modifies the original virtual source so as to indirectly impose phasor current limits. If the limits aren't reached, the resulting virtual voltage is the same as that which is calculated from the original technique (i.e., without imposing any phasor current limits).

In one or more embodiments, the current limiting is done by overwriting the droop-determined desired real and/or reactive phasor current value by a limited set point value determined from the current limiting techniques (such as the maximum real and/or reactive current that the power converter 102 is capable of generating at the time, a reduced reactive current component when the magnitude of the apparent current would exceed a maximum current rating during AC battery discharge, and the like). When one of the phasor currents requires limiting, this technique produces instantaneous currents driven by the power converter 102 such that, over each grid cycle, one type of phasor current generated—either the real or reactive phasor current as set by the limited set point value—is limited to a fixed amount while the other type of current is not and remains droop-controlled. If both of the droop-determined desired phasor currents require limiting, the droop-determined desired phasor current values are each overwritten by a corresponding limited set point value and the resulting instantaneous current drives the power converter 102 such that both the real and reactive phasor currents are limited to fixed amounts.

The virtual voltage-virtual impedance control technique employed by the power converters 102 integrates phasor-based current limiting into a time-domain approach that allows the phase/amplitude of the virtual voltage source to be altered such that when either the desired real power or the desired reactive power determined via the droop technique should be limited, the corresponding real or reactive current phasor will be a set value while the remaining desired current phasor remains unchanged; if both the desired real and reactive phasor currents cannot be provided, both are limited. The virtual voltage-virtual impedance control technique keeps the control technique in the time domain for good dynamic response and, when only one of the droop-determined real or reactive phasor current needs to be limited, maintains load sharing of the current that is not purposely being altered while allowing the other current phasor to be set to a selected value. The virtual voltage-virtual impedance control technique described herein is implemented in each power converter 102 (i.e., by the corresponding control module 114) and the algorithm is designed such that, when islanded, the powers naturally converge as a result of each power converter 102 "seeing" the same AC waveform on the bus 108.

In some embodiments, the AC power generated by the power converters 102 is single-phase AC power and each power converter 102 is controlled to appear as a single-phase virtual AC voltage source as described herein. In other embodiments, the power converters 102 generate three-phase AC power and each power converter 102 is controlled to appear as a three-phase virtual AC voltage source as described herein.

In one or more embodiments, the system 100 may use the droop-control techniques described herein following a black-start, for example as described in commonly assigned, co-pending U.S. patent application Ser. No. 15/047,337, filed Feb. 18, 2016, and titled "Method and Apparatus for Activation and De-Activation of Power Conditioners in Distributed Resource Island System Using Low Voltage AC", which is herein incorporated in its entirety by reference.

In certain embodiments, other forms of droop control may be used as the techniques described herein may be used with any other form of droop control.

Figure 2:
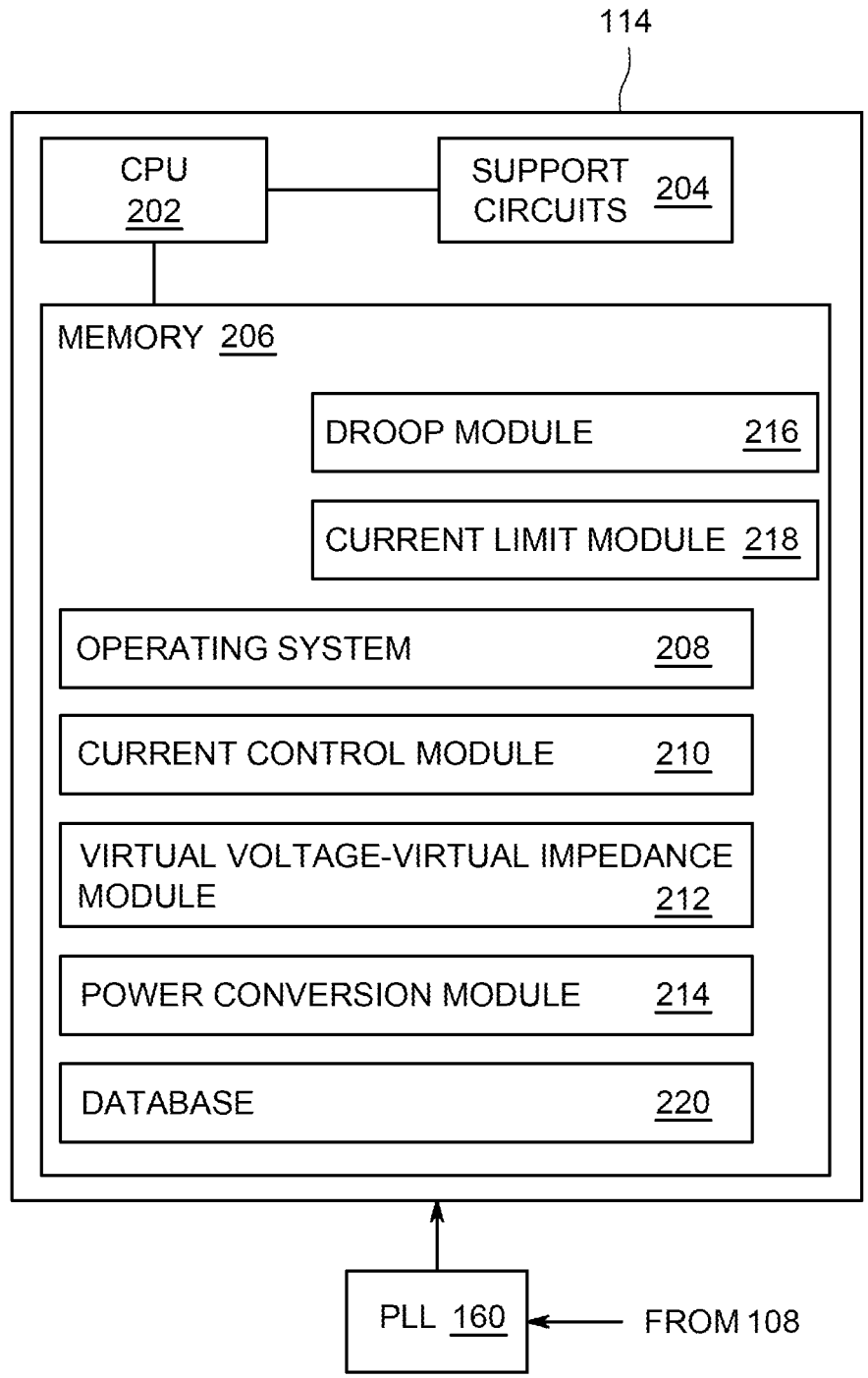
FIG. 2 is a block diagram of a controller coupled to a PLL in accordance with one or more embodiments of the present invention.

FIG. 2 is a block diagram of a controller 114 coupled to a PLL 160 in accordance with one or more embodiments of the present invention. The PLL 160 receives samples of the voltage on the bus 108 (e.g., from a voltage sampler coupled to the bus 108), generates a signal indicative of the bus voltage waveform (amplitude, phase and frequency), and couples the generated signal to the controller 114.

The controller 114 comprises support circuits 204 and a memory 206, each coupled to a central processing unit (CPU) 202. The CPU 202 may comprise one or more processors, microprocessors, microcontrollers and combinations thereof configured to execute non-transient software instructions to perform various tasks in accordance with embodiments of the present invention. The CPU 202 may additionally or alternatively include one or more application specific integrated circuits (ASICs). In some embodiments, the CPU 202 may be a microcontroller comprising internal memory for storing controller firmware that, when executed, provides the controller functionality herein. The controller 114 may be implemented using a general purpose computer that, when executing particular software, becomes a specific purpose computer for performing various embodiments of the present invention.

The support circuits 204 are well known circuits used to promote functionality of the CPU 202. Such circuits include, but are not limited to, a cache, power supplies, clock circuits, buses, input/output (I/O) circuits, and the like. The controller 114 may be implemented using a general purpose computer that, when executing particular software, becomes a specific purpose computer for performing various embodiments of the present invention. In one or more embodiments, the CPU 202 may be a microcontroller comprising internal memory for storing controller firmware that, when executed, provides the controller functionality described herein.

The memory 206 may comprise random access memory, read only memory, removable disk memory, flash memory, and various combinations of these types of memory. The memory 206 is sometimes referred to as main memory and may, in part, be used as cache memory or buffer memory. The memory 206 generally stores the operating system (OS) 208, if necessary, of the controller 114 that can be supported by the CPU capabilities. In some embodiments, the OS 208 may be one of a number of commercially available operating systems such as, but not limited to, LINUX, Real-Time Operating System (RTOS), and the like.

The memory 206 stores non-transient processor-executable instructions and/or data that may be executed by and/or used by the CPU 202. These processor-executable instructions may comprise firmware, software, and the like, or some combination thereof. The memory 206 stores various forms of application software, such as a droop control module 216, a current limit module 218, a current control module 210 for determining the controlled real and reactive phasor current values as described herein, a virtual voltage-virtual impedance module 212 for determining the instantaneous current as described herein, and a power conversion module 214 for driving the power converter 102 to generate the instantaneous current.

The droop control module 216 determines the desired real and reactive phasor currents (i.e., the droop-determined desired phasor currents) by any suitable droop technique where the desired real and reactive phasor current values are determined as a function of grid voltage and frequency. Such droop techniques include volt-var-frequency-watt droop where Ia=Ka*(Frequency Error), Ir=Kr*(Voltage Error); cross-coupled volt-var-frequency-watt droop where Ia'=Ka*(Frequency Error), Ir'=Kr*(Voltage Error), Ia=X/Z*Ia'+R/Z*Ir', and Ir=R/Z*Ia'+X/Z*Ir'; non-linear droop; and the like. When operating in islanded mode, the droop control module 216 calculates, for an ideal situation with unlimited resources, the desired amount of active and reactive phasor currents to be injected into the islanded grid to help support the grid and/or to be drawn from the grid for storage in the AC batteries 180. The current limits module 218 determines one or more desired phasor currents to be generated based on one or more current limiting techniques (such as MPPT, economic optimizations, charge control, advanced grid functions, demand response, prioritizing AC battery active power flow during AC battery charging, and the like) that manage the physical limitations of the power conditioner 102 and/or the physical limitations of the resource feeding that power conditioner 102. The current control module 210 applies the current limits to the droop-determined desired phasor currents as necessary. Further detail on the functionality provided by the droop module 216 and the current control module 210 is described below with respect to FIGS. 4 and 5; further detail on the functionality provided by the current limits module 218 is described below with respect to FIG. 4.

In some embodiments the droop module 216 runs continuously—i.e., when the power conditioner 102 is islanded as well as when it is grid-connected—and current limits determined from one or more current limiting techniques, such as MPPT or prioritizing AC battery active power flow during AC battery charging, are then applied by the current control module 210 as applicable. Such operation allows a seamless transition between operating in an islanded state and operating in a grid-connected state. In some alternative embodiments, the desired real and reactive phasor currents are determined solely by the current limits module 219 (e.g., by an MPPT or charge control technique) when the power conditioner 102 is grid-connected, and, when the power conditioner 102 is islanded, the droop module 216 operates to determine desired phasor current values with limits from the current limits module 218 applied as necessary by the current control module 210.

Further detail on the functionality provided by the virtual voltage-virtual impedance module 212 is described below with respect to FIGS. 3 and 4, and further detail on the functionality provided by the current control module 210 is described below with respect to FIGS. 4 and 5 In various embodiments, one or more of the power conversion module 214, the droop control module 216, the current limit module 218, the current control module 210, and the virtual voltage-virtual impedance module 210, or portions thereof, are implemented in software, firmware, hardware, or a combination thereof.

The memory 206 additionally stores a database 220 for storing data related to the operation of the power converter 102 and/or the present invention, such as one or more thresholds, equations, formulas, curves, and/or algorithms for the control techniques described herein.

In some other embodiments, the PLL 160 may be part of the controller 114; e.g., the PLL 160 may be a module within the memory 206.

Figure 3:
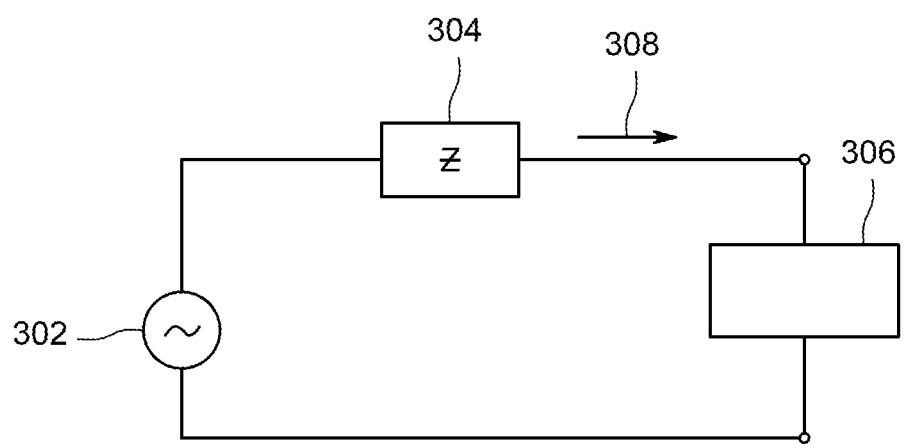
FIG. 3 is a block diagram of a virtual voltage in series with a virtual impedance in accordance with one or more embodiments of the present invention.

FIG. 3 is a block diagram of a virtual voltage-virtual impedance circuit 300 in accordance with one or more embodiments of the present invention. The virtual voltage-virtual impedance circuit 300 (also referred to as the circuit 300) comprises a virtual voltage source 302 in series with a virtual source impedance 304. The series combination of the virtual voltage source 302 and the virtual source impedance 304 (also referred to as virtual impedance 304) is coupled across a grid 306, and the virtual voltage source 302 drives the current 308 to flow in the circuit 300. The grid 306 may be an islanded grid (i.e., when the power converter 102 is disconnected from another power grid by the IID 140 and is in an islanded state) or the grid 306 may be an interconnected grid (i.e., when the power converter 102 is coupled to another power grid, such as a commercial power grid, via the IID 140).

In accordance with one or more embodiments of the present invention, each power converter 102 is controlled (by its corresponding controller 114) to appear, from the perspective of the grid 306, as the virtual voltage source 302 in series with the virtual impedance 304, where real and reactive phasor currents for the power converter 102 are indirectly controlled by modifying amplitude and phase of a virtual voltage waveform that defines the virtual voltage source 302. Generally, each power converter 102 is controlled to imitate the virtual voltage source 302 in series with the virtual source impedance 304 independent of whether the system 100 is islanded or grid-connected, thereby enabling a seamless transition between operating in a grid-connected environment and an islanded environment, although in some alternative embodiments the power converters 102 employ a different control technique when the system 100 is coupled to the power grid.

The virtual voltage source 302 (i.e., the virtual voltage waveform representing the virtual voltage source 302) is computed based on controlled phasor current values—e.g., real and reactive phasor current values that have limits applied as necessary—to integrate indirect control of active and reactive current phasors into the generation of the virtual voltage source 302. In some embodiments, the virtual voltage waveform, which may also be referred to as the current-controlled virtual voltage waveform, may be computed using Equation (13) described below, although in other embodiments other equations where the virtual voltage waveform is computed as a function of real and reactive phasor current values, or as a function of modified real and reactive phasor current values described below, may be used in order to apply phasor current control as necessary.

The virtual voltage source 302, as defined by the current-controlled virtual voltage waveform, is applied to the virtual impedance 304 in order to determine the current 308, where the current 308 represents the amount of instantaneous current to be injected by the power converter 102 into the bus 108 (or drawn from the bus 108 by the power converter 102 when a corresponding AC battery 180 is charging) in real-time. In certain embodiments, the circuit 300 depicts an implementation of the virtual voltage-virtual impedance module 212; i.e., the virtual voltage-virtual impedance module 212 digitally simulates the circuit 300 to determine the instantaneous current value. In one or more of such embodiments, the simulation may run at a frequency of 1 MHz and the instantaneous current value is updated every microsecond.

In one or more embodiments, the current-controlled virtual voltage waveform may be derived as described below using a phase-shift virtual impedance droop technique where the virtual voltage source 302 is defined as a sinusoidal voltage source having a constant amplitude and is phase-shifted from the grid frequency proportional to the difference between the measured grid frequency and the nominal grid frequency. When there is excess generation, the grid frequency will increase which will eventually change the polarity of the frequency error, causing the virtual voltage to lag the output voltage rather than lead it and thereby causing active current to be pulled from the grid for charging the AC battery 180. In some alternative embodiments, the voltage source amplitude may be set differently among one or more of the power converters 102.

In one or more particular embodiments, desired droop-determined phasor currents may be calculated from the measured voltage and frequency using the technique as follows. The amplitude of the virtual voltage source 302 is set at the constant amplitude Uset, where Uset is the set point voltage for the system (i.e., the peak value of the nominal grid voltage, for example $\sqrt{2}*240=339.4V$ for a 240V AC system). The angle of the virtual voltage source 302 is offset from the grid angle θ by an amount ψ that is proportional by a gain factor of k to the error in the measured grid frequency f and the target frequency $f_o$, where the factor k may be determined based on a desired magnitude of frequency change for operating the system.

For a single-phase AC system, the virtual voltage source 302 may be expressed as the virtual voltage source waveform:

$$Usrc = Uset*(\sin(\theta+\psi)) \quad (1)$$

The measured grid angle θ and the measured grid frequency f are obtained from the PLL 160. For a three-phase AC system, the virtual voltage source waveform is a three-phase waveform comprising the waveform in Equation (1) plus two additional waveforms as given by Equation (1) that are then phase-shifted by 120° and 240°.

The virtual impedance 304 comprises a real (i.e., resistive) portion R and a reactive portion X. Generally the ratio X/R is set to a fixed value, although in certain embodiments it may be dynamically changed, e.g., based on the state of the system 100. For example, in some embodiments the ratio X/R may be selected to match the impedance ratio at the point of common coupling (PCC) looking towards the power grid when grid connected, and when islanded the ratio X/R may then be set to match the ratio between frequency and voltage load governing. In some embodiments, the ratio X/R is set to equal 1, which provides good damping characteristics and results in voltage and frequency both changing as a function of real and reactive power.

In order to determine the virtual voltage source 302, values for the desired real and reactive phasor currents are first determined and limited as necessary, where the limits are obtained from one or more current limiting techniques. When power converters 102 are operating as DC-AC inverters (which for the power conditioners 102-N+1 and 102-N+2 occurs when the AC batteries 180 are operating in a discharge mode), such current limiting techniques may include one or more of MPPT, economic optimizations, charge control, advanced grid functions, or the like; when power converters 102 are operating as AC-DC inverters (i.e., when the AC batteries 180 are operating in a charge mode), such current limiting techniques include prioritizing active power flow. The resulting controlled phasor current values are then used in computing the virtual voltage source 302, for example as described below with respect to Equations (8)-(13).

In order to determine the instantaneous current value for driving the power converter 102, the virtual voltage source waveform is updated to incorporate any necessary real and/or reactive phasor current limits. First, "modified" real and reactive currents Ia' and Ir', respectively, are determined based on the standard phase shift virtual impedance droop control technique:

$$Ia' = \frac{Uset*\sin(\psi)}{Z} \quad (2)$$

$$Ir' = \frac{Uset*\cos(\psi) - U1d}{Z} \quad (3)$$

where Ia' and Ir' are the modified real and reactive phasor currents, respectively; Uset is the constant voltage amplitude set point for the system; Z is the overall magnitude of the virtual source impedance 304; ψ is proportional to the measured grid frequency f and the target frequency $f_o$; and U1d is the amplitude of the fundamental component of the grid (e.g., as determined by a PLL 160).

Next, values for the corresponding desired real and reactive phasor currents Ia and Ir, respectively, required from the power converter are determined using the inverse of a known rotational transformation matrix $$T = \begin{bmatrix} \frac{X}{Z} & -\frac{R}{Z} \\ \frac{R}{Z} & \frac{X}{Z} \end{bmatrix},$$

where X is the amplitude of the reactive portion of the virtual source impedance 304, R is the real (i.e. resistive) portion of the virtual source impedance 304, and Z is the overall magnitude of the virtual source impedance 304:

$$Ia = \frac{X}{Z}Ia' + \frac{R}{Z}Ir' \quad (4)$$

$$Ir = -\frac{R}{Z}Ia' + \frac{X}{Z}Ir' \quad (5)$$

Although the droop-determined desired phasor current values are described above as being derived using the phase-shift virtual impedance droop technique, in other embodiments they may be derived by other droop techniques. For example, droop techniques such as volt-var-frequency-watt, cross-coupled volt-var-frequency-watt, non-linear droop, or the like may be used.

Once the droop-determined desired phasor current values are determined, limits are imposed on the desired real and reactive current values Ia and Ir as follows:

if(Ia>real current threshold),{Ia(controlled)=IaAbsMax} (6a)

if(Ia<−real current threshold),{Ia(controlled)=−IaAbsMax} (6b)

if(Ir>reactive current threshold),{Ir(controlled)=IrAbsMax} (7a)

if(Ir<−reactive current threshold),{Ir(controlled)=−IrAbsMax} (7b)

where IaAbsMax and IrAbsMax are each fixed values. These individual limits ensure that the Ia and Ir current phasors are within set limits. After this operation, an apparent power limiting is also applied as follows:

if(Ia(controlled)^2+Ir(controlled)^2>IsAbsMax^2),{Ir(controlled)=sqrt(IsAbsMax^2−Ia(controlled)^2)} (7c)

where IsAbsMax, which also may be referred to as a charge threshold, is generally equal to the maximum allowable apparent current based on the hardware limitations of the power converter 102. This will limit the active and reactive currents to be within the apparent current limit while prioritizing the active current.

Otherwise, if none of the conditions in equations (6a)-(7c) are met, the controlled phasor current value is equal to the corresponding droop-determined desired phasor current value. Generally, the real and reactive current thresholds are equal to IaAbsMax and IrAbsMax, respectively, where IaAbsMax and IrAbsMax are obtained from one or more current limiting techniques (such as MPPT, economic optimizations, charge control, advanced grid functions, prioritizing active power flow during AC battery charging, or the like), and the charge threshold (i.e., IsAbsMax) is equal to the maximum allowable apparent current based on the hardware limitations of the power conditioner 102. In some embodiments though, the real and or reactive current threshold may be different from the values of IaAbsMax and IrAbsMax, and/or the charge threshold may be different from the power conditioner maximum allowable apparent current. Limiting is done in both the positive and negative directions to account for power flow in either direction in the power converters 102. In some alternative embodiments, other algorithms maybe used to generate the controlled current phasor values in addition to and/or in place of the current limiting shown in Equations (6)-(7).

Based on the limits imposed, the resulting controlled real and reactive phasor current values are used to determine new modified real and reactive currents Ia'(controlled) and Ir'(controlled), respectively, using the rotational transformation matrix T:

$$Ia'(\text{controlled}) = \frac{X}{Z} Ia(\text{controlled}) - \frac{R}{Z} Ir(\text{controlled}) \quad (8)$$

$$Ir'(\text{controlled}) = \frac{R}{Z} Ia(\text{controlled}) + \frac{X}{Z} Ir(\text{controlled}) \quad (9)$$

As described above, Usrc=Uset*(sin(θ+ψ)) is set by definition. In one embodiment, a virtual voltage source waveform with limits imposed as necessary (i.e., the current-controlled virtual voltage source waveform) is determined as follows:

$$Usrc = Uset * (\sin(\theta + \psi)) \quad (10)$$
$$= Uset * (\sin\psi \cos\theta + \cos\psi \sin\theta) \quad (11)$$
$$= (Uset * \sin\psi)\cos\theta + (Uset * \cos\psi)\sin\theta \quad (12)$$

where θ=the grid phase. Using Ia' *Z=Uset*sin ψ and Ir'*Z+U1d=Uset*cos ψ, (from Equations (2) and (3) above), the current-controlled Usrc can be computed as:

$$Usrc(\text{controlled}) = (Ia'(\text{controlled})*Z)*\cos\theta + (Ir'(\text{controlled})*Z + U1d)*\sin\theta \quad (13)$$

In some other embodiments, other derivations of Equation (13) may be used.

The computed current-controlled virtual voltage source waveform is then used in simulating the virtual voltage-virtual impedance circuit 300 to determine the instantaneous current value for controlling power conversion by the power converter 102. As the cos θ, sin θ, and U1d terms are outputs from the PLL 160, the algorithm given by Equation (13) for Usrc contains no square root functions and minimal trigonometric functions and thus is a highly efficient algorithm for computation.

Figure 4:
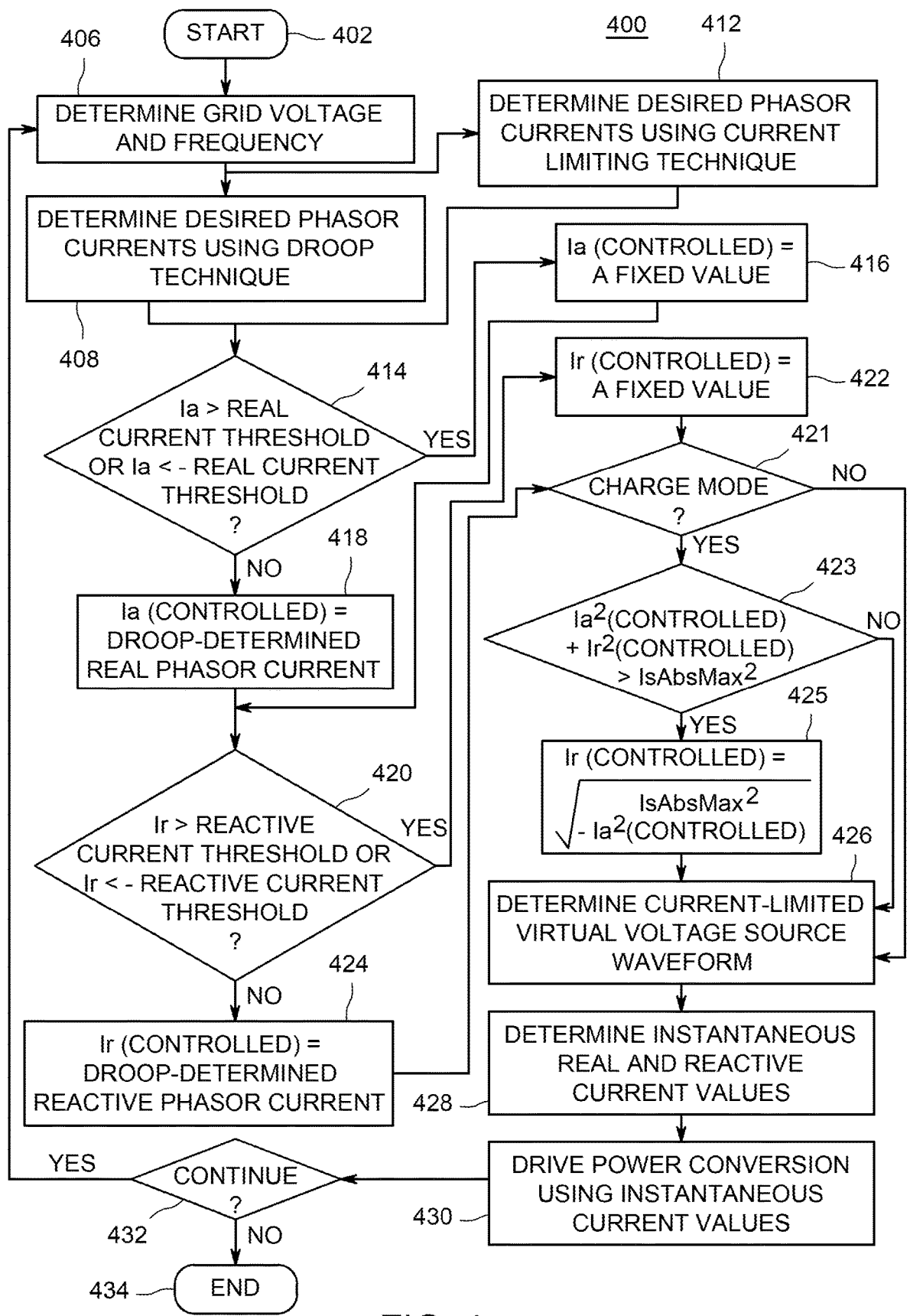
FIG. 4 is a flow diagram of a method for current control in a power converter in accordance with one or more embodiments of the present invention.

FIG. 4 is a flow diagram of a method 400 for current control in a power converter in accordance with one or more embodiments of the present invention. The power converter is part of a microgrid and receives input power from an input power source and generates an output power; in some embodiments, such as the embodiment described below, the power converter may be a bidirectional converter that can convert DC-AC and AC-DC and store the generated DC (e.g., in a battery). The microgrid may be a single-phase AC system or, alternatively, a three-phase AC system.

The power converter, along with other analogous power converters, is coupled to an AC bus that is coupled to one or more loads (e.g., via a load center). In some embodiments, the power converter is a power converter 102 of the system 100 previously described, and the method 400 comprises an implementation of the droop module 216, the current limits module 218, the current control module 210, the virtual voltage-virtual impedance module 212, and the power conversion module 214. Generally, the microgrid may be capable of operating in an islanded state as well as in a grid-connected state, although in other embodiments, the microgrid is completely separate from another power grid and operates intentionally as an independent microgrid.

The method 400 starts at step 402 and proceeds to step 406. At step 406, the voltage and frequency of the grid are determined, for example by a PLL such as the PLL 160. In some embodiments the grid is an islanded grid, while in other embodiments the grid is an interconnected grid. In some alternative embodiments where the grid is an islanded grid, the voltage and frequency may be determined after the power converter resumes operation following the grid disconnection, for example following a black-start as described in commonly assigned, co-pending U.S. patent application Ser. No. 15/047,337, filed Feb. 18, 2016, and titled "Method and Apparatus for Activation and De-Activation of Power Conditioners in Distributed Resource Island System Using Low Voltage AC.

The method 400 proceeds to steps 408 and 412. At step 408, desired real and reactive phasor currents for the power converter are determined using a droop technique. The desired phasor currents may be determined by any suitable droop technique where the desired real and reactive phasor currents are determined as a function of grid voltage and frequency, such as phase shift virtual impedance droop technique, volt-var-frequency-watt droop, cross-coupled volt-var-frequency-watt droop, non-linear droop; and the like. Droop equations employed by the droop technique used may be offset as needed to achieve desired objectives when the microgrid is grid-connected (for example, to control the net intertie to a residence) as well as when the microgrid is islanded.

At step 412, desired phasor currents are determined using one or more current limiting techniques, such as MPPT, one or more economic optimizations, charge control, advanced grid functions, prioritizing active power flow during AC battery charging, or the like. The method 400 proceeds from steps 408 and 412 to step 414.

At step 414, a determination is made whether the droop-determined desired real phasor current value exceeds a real current threshold or is less than the negative of the real current threshold. Generally, the real current threshold is equal to the absolute value of the maximum amount of real current that the power converter is capable of generating at that time, where the maximum amount of real current is determined by one or more of the current limiting techniques. If the result of the determination is no, the method 400 proceeds to step 418 where the controlled real phasor current value (i.e., Ia(controlled)) is set to a fixed value, such as the droop-determined desired real phasor current value. The method 400 then proceeds to step 420.

If at step 414 the result of the determination is yes, that the droop-determined desired real phasor current value exceeds the real current threshold or is less than the negative of the real current threshold, the method 400 proceeds to step 416 where the controlled phasor current value (i.e., Ia(controlled)) is set to a fixed value. Generally, the fixed value is equal to the real current threshold when the droop-determined desired real phasor current value exceeds the real current threshold, and the fixed value is equal to the negative of the real current threshold when the droop-determined desired real phasor current value is less than the negative of the real current threshold. The method 400 proceeds from step 416 to step 420.

At step 420, a determination is made whether the droop-determined desired reactive current value exceeds a reactive current threshold or is less than the negative of the reactive current threshold. Generally, the reactive current threshold is equal to the absolute value of the maximum amount of reactive current that the power converter is capable of generating at that time, where the maximum amount of reactive current is determined by one or more of the current limiting techniques.

If at step 420 the result of the determination is yes, that the droop-determined desired reactive phasor current value exceeds the reactive current threshold or is less than the negative of the reactive current threshold, the method 400 proceeds to step 422 where the controlled desired reactive phasor current value (i.e., Ir(controlled)) is set to a fixed value. Generally, the fixed value is equal to the reactive current threshold when the droop-determined desired reactive phasor current value exceeds the reactive current threshold, and the fixed value is equal to the negative of the reactive current threshold when the droop-determined desired reactive phasor current value is less than the negative of the reactive current threshold. The method 400 proceeds from step 422 to step 421.

If the result of the determination at step 420 is no, the method 400 proceeds to step 424 where the controlled reactive phasor current value (i.e., Ir(controlled)) is set to the droop-determined desired reactive phasor current value. The method 400 then proceeds to step 421.

At step 421, a determination is made whether the power conditioner is operating in a charge mode. If the result of the determination is no, the power conditioner is not operating in a charge mode, the method 400 proceeds to step 426. If the result of the determination at step 421 is yes, that the power conditioner is operating in a charge mode, the method 400 proceeds to step 423 for a determination to be made whether apparent power limiting is to be applied. At step 423, a determination is made whether the desired apparent current—i.e., the magnitude of the vector sum of the controlled desired real (i.e., active) and reactive current components—exceeds a charge threshold. The desired apparent current is computed as the square root of the sum of the squared values of the controlled desired real and reactive values (i.e., square root (Ia(controlled)$^2$+Ir(controlled)$^2$)) and the charge threshold (i.e., IsAbsMax) is equal to the maximum allowable apparent current of the power conditioner; in certain embodiments, rather than comparing the square root of (Ia(controlled)$^2$+Ir(controlled)$^2$) to the charge threshold, the determination is made whether (Ia(controlled)$^2$+Ir(controlled)$^2$) exceeds the charge threshold squared. In other embodiments, the charge threshold may be set to a different value.

If the result of the determination at step 423 is no, the method 400 proceeds to step 426.

If the result of the determination at step 424 is yes, the method 400 proceeds to step 425. At step 425, the controlled reactive phasor current value (i.e., Ir(controlled)) is set to a fixed value, such as the square root of the difference between the maximum current rating of the power conditioner squared and the controlled desired real current value as in Equation (7c), although in other embodiments the controlled reactive phasor current value may be set to a different fixed value. The method 400 proceeds from step 425 to step 426.

At step 426, a current-controlled virtual voltage source waveform is determined using the controlled phasor current values Ia(controlled) and Ir(controlled), for example as previously described with respect to Equations (8)-(13). In some embodiments, the step 406 is an implementation of the droop module 216, the step 412 is an implementation of the current limits module 218, and the steps 414-426 are an implementation of the current control module 210. One particular embodiment of the steps 408 and 414-426 of the method 400 is described below with respect to FIG. 5.

The method 400 proceeds from step 426 to step 428, where the current-controlled virtual voltage source waveform is applied to a virtual impedance for determine the instantaneous current value to be commanded from the power converter, where the virtual impedance may be determined as previously described. In some embodiments, the step 428 is an implementation of the virtual voltage-virtual impedance module 212.

The method 400 proceeds to step 430, where the instantaneous current value is used to control power generation by the power converter; i.e., the power converter is commanded to inject an amount of current into the grid in real time in accordance with the instantaneous current value, respectively. In some embodiments, step 430 is an implementation of the power conversion module 214. The method 400 proceeds from step 430 to step 432.

At step 432, a determination is made whether to continue operating. If the result of the determination is yes, the method 400 returns to step 406. In some embodiments, the method 400 is repeated every microsecond; i.e., the instantaneous current value commanded from the power converter is updated every microsecond.

If at step 432 the result of the determination is no, the method 400 proceeds to step 434 where it ends.

Figure 5:
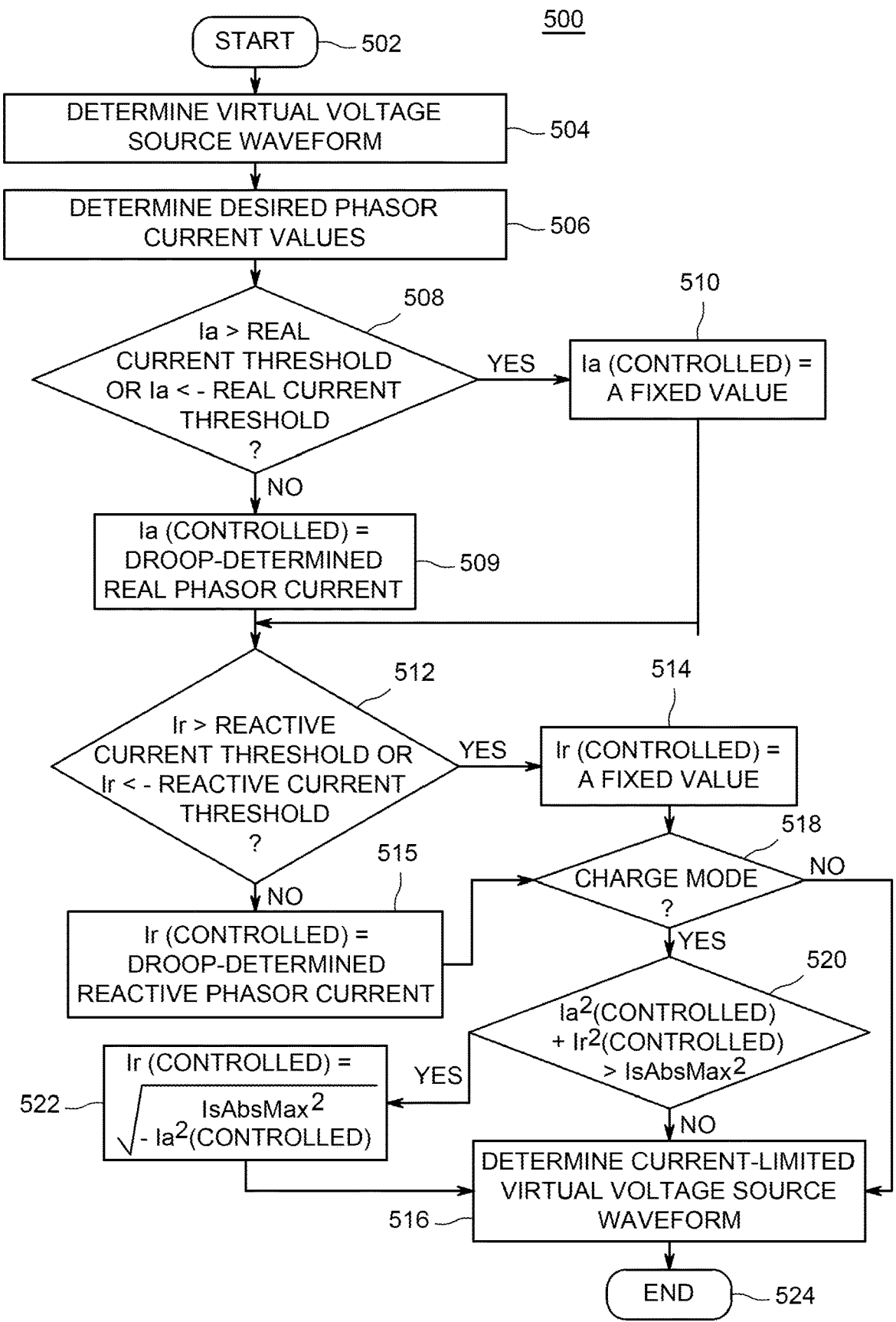
FIG. 5 is a flow diagram of a method for determining a current-controlled virtual voltage source waveform in accordance with one or more embodiments of the present invention.

FIG. 5 is a flow diagram of a method 500 for determining a current-controlled virtual voltage source waveform in accordance with one or more embodiments of the present invention. The current-controlled virtual voltage source waveform is computed using controlled phasor current values determined based on a phase shift virtual impedance droop technique. The current-controlled virtual voltage source waveform is used for determining instantaneous current values to be commanded from a power converter that is part of a microgrid (e.g., a power converter 102), where the microgrid may either be grid-connected or islanded. The method 500 is one embodiment of the steps 408 and 414-426 of the method 400.

The method 500 starts at step 502 and proceeds to step 504. At step 504, the virtual voltage source waveform is defined based on a standard phase shift virtual impedance droop technique as previously described with respect to in Equation (1). In some embodiments, the microgrid comprising the power converter is a single-phase AC system and the virtual voltage source waveform is a single-phase AC waveform as in Equation (1). In other embodiments the microgrid is a three-phase AC system and the virtual voltage source waveform comprises the waveform in Equation (1) plus two additional waveforms as in Equation (1) that are then phase-shifted by 120° and 240°.

The method 500 proceeds to step 506, where the droop-determined desired real and reactive phasor current values are determined as previously described with respect to Equations (2)-(5). At step 508, a determination is made whether the droop-determined desired real phasor current value exceeds a real current threshold or is less than the negative of the real current threshold. In some embodiments, the real current threshold is equal to the desired real phasor current value determined from one or more current limiting techniques as previously described. If the result of the determination is no, the method 500 proceeds to step 509, where the controlled real phasor current value (i.e., Ia(controlled)) is set to the droop-determined desired real phasor current value. The method 500 proceeds from step 509 to step 512.

If at step 508 the result of the determination is yes, that the droop-determined desired real current phasor value exceeds the real current threshold or is less than the negative of the real current threshold, the method 500 proceeds to step 510. At step 510, the controlled real current phasor value (i.e., Ia(controlled)) is set to a fixed value. Generally, the fixed value is equal to the real current threshold when the droop-determined desired real phasor current value exceeds the real current threshold, and the fixed value is equal to the negative of the real current threshold when the droop-determined desired real phasor current value is less than the negative of the real current threshold. The method 500 proceeds from step 510 to step 512.

At step 512, a determination is made whether the droop-determined desired reactive phasor current value exceeds a reactive current threshold or is less than the negative of the reactive current threshold. Generally, the reactive current threshold is equal to the absolute value of the maximum amount of reactive current that the power converter is capable of generating at that time, where the maximum amount of reactive current is equal to the desired reactive phasor current determined by one or more of the current limiting techniques previously described.

If at step 512 the result of the determination is yes, that the droop-determined desired reactive phasor current value exceeds the reactive current threshold or is less than the negative of the reactive current threshold, the method 500 proceeds to step 514. At step 514, the controlled reactive phasor current value is set to a fixed value. Generally, the fixed value is equal to the reactive current threshold when the droop-determined desired reactive phasor current value exceeds the reactive current threshold, and the fixed value is equal to the negative of the reactive current threshold when the droop-determined desired reactive phasor current value is less than the negative of the reactive current threshold. The method 500 proceeds from step 514 to step 518.

If the result of the determination at step 512 is no, the method 500 proceeds to step 515 where the controlled reactive phasor current value (i.e., Ir(controlled)) is set to the droop-determined desired reactive phasor current value. The method 500 then proceeds to step 518.

At step 518, a determination is made whether the power conditioner is operating in a charge mode. If the result of the determination is no, the power conditioner is not operating in a charge mode, the method 500 proceeds to step 516. If the result of the determination at step 518 is yes, that the power conditioner is operating in a charge mode, the method 500 proceeds to step 520. At step 520, a determination is made whether the desired apparent current—i.e., the magnitude of the vector sum of the controlled desired real (i.e., active) and reactive current components—exceeds a charge threshold. The desired apparent current is computed as the square root of the sum of the squared values of the controlled desired real and reactive values (i.e., square root (Ia(controlled)$^2$+Ir(controlled)$^2$)) and the charge threshold (i.e., IsAbsMax) is equal to the maximum allowable apparent current of the power conditioner; in certain embodiments, rather than comparing the square root of (Ia(controlled)$^2$+Ir(controlled)$^2$)) to the charge threshold, the determination is made whether (Ia(controlled)$^2$+Ir(controlled)$^2$)) exceeds the charge threshold squared. In other embodiments, the charge threshold may be set to a different value.

If the result of the determination at step 520 is no, the method 500 proceeds to step 516.

If the result of the determination at step 520 is yes, the method 500 proceeds to step 522. At step 522, the controlled reactive phasor current value (i.e., Ir(controlled)) is set to a fixed value, such as the square root of the difference between the maximum current rating of the power conditioner squared and the controlled desired real current value as in Equation (7c), although in other embodiments the controlled reactive phasor current value may be set to a different fixed value. The method 500 proceeds from step 522 to step 516.

At step 516, a current-controlled virtual voltage source waveform is determined using the controlled phasor current values Ia(controlled) and Ir(controlled), for example as previously described with respect to Equations (8)-(13). The method 500 proceeds to step 524 where it ends.

Although the methods 400 and 500 describe prioritizing active power flow during AC battery charging, in some alternative embodiments the same technique may be used to prioritize active power flow during AC battery discharge.

While the foregoing is directed to embodiments of the present invention, other and further embodiments of the invention may be devised without departing from the basic scope thereof, and the scope thereof is determined by the claims that follow.

The invention claimed is:

1. A method for power converter current control, comprising:
controlling an instantaneous current generated by a power converter that is part of an AC battery such that the power converter appears, from the perspective of an AC line coupled to the power converter, as a virtual AC voltage source in series with a virtual impedance, wherein real and reactive phasor currents for the power converter are indirectly controlled by modifying amplitude and phase of a virtual AC voltage waveform that defines the virtual AC voltage source.

2. The method of claim 1, wherein the instantaneous current is determined by:
determining a desired real phasor current value and a desired reactive phasor current value by a droop control technique;
generating a controlled real phasor current value based on a comparison between the desired real phasor current value and a real phasor current threshold;
generating a controlled reactive phasor current value based on (a) a first comparison between the desired reactive phasor current value and a reactive phasor current threshold and (b) a comparison between a charge threshold and an apparent current based on the controlled real phasor current value and a result of the first comparison;
computing the virtual AC voltage waveform based on the controlled real and reactive phasor current values; and determining an instantaneous current value for driving the power converter to emulate the virtual impedance in the time domain while generating an amount of real and reactive current equal to the controlled real and reactive phasor current values.

3. The method of claim 2, wherein the real and reactive phasor current thresholds are determined using one or more current limiting techniques, and wherein the apparent current is the magnitude of the vector sum of the controlled real phasor current value and the controlled reactive phasor current value.

4. The method of claim 3, wherein the current limiting techniques comprise one or more of maximum power point tracking (MPPT), economic optimization, charge control, advanced grid functions, or demand response, and wherein the charge threshold is equal to a maximum allowable apparent current based on hardware limitations of the power converter.

5. The method of claim 2, wherein the droop control technique is a phase-shifted virtual voltage-virtual impedance droop technique, wherein the virtual AC voltage waveform is a sinusoidal waveform having a constant amplitude and a phase shifted from the frequency of the AC line by an amount proportional to the difference between a measured frequency of the AC line and a nominal frequency of the AC line.

6. The method of claim 4, wherein:
if the magnitude of the apparent current is greater than the charge threshold, the controlled reactive phasor current value is set equal to the maximum allowable apparent current;
if the desired real phasor current value is greater than the real phasor current threshold, the controlled real phasor current value is set equal to the real phasor current threshold;
if the desired real phasor current value is less than the negative of the real phasor current threshold, the controlled real phasor current value is set equal to the negative of the real phasor current threshold;
if the magnitude of the apparent current is not greater than the charge threshold and the desired reactive phasor current value is greater than the reactive phasor current threshold, the controlled reactive phasor current value is set equal to the reactive phasor current threshold; and
if the magnitude of the apparent current is not greater than the charge threshold and the desired reactive phasor current value is less than the negative of the reactive phasor current threshold, the controlled reactive phasor current value is set equal to the negative of the reactive phasor current threshold.

7. The method of claim 3, wherein the instantaneous current is controlled such that the power converter appears as the virtual AC voltage source when the power converter is grid-connected and when the power converter is islanded to enable a seamless transition between operating in a grid-connected state and operating in an islanded state.

8. An apparatus for power converter current control, comprising:
a controller for controlling an instantaneous current generated by a power converter that is part of an AC battery such that the power converter appears, from the perspective of an AC line coupled to the power converter, as a virtual AC voltage source in series with a virtual impedance, wherein real and reactive phasor currents for the power converter are indirectly controlled by modifying amplitude and phase of a virtual AC voltage waveform that defines the virtual AC voltage source.

9. The apparatus of claim 8, wherein the instantaneous current is determined by:
determining a desired real phasor current value and a desired reactive phasor current value by a droop control technique;
generating a controlled real phasor current value based on a comparison between the desired real phasor current value and a real phasor current threshold;
generating a controlled reactive phasor current value based on (a) a first comparison between the desired reactive phasor current value and a reactive phasor current threshold and (b) a comparison between a charge threshold and an apparent current based on the controlled real phasor current value and a result of the first comparison;
computing the virtual AC voltage waveform based on the controlled real and reactive phasor current values; and
determining an instantaneous current value for driving the power converter to emulate the virtual impedance in the time domain while generating an amount of real and reactive current equal to the controlled real and reactive phasor current values.

10. The apparatus of claim 9, wherein the real and reactive phasor current thresholds are determined using one or more current limiting techniques, and wherein the apparent current is the magnitude of the vector sum of the controlled real phasor current value and the controlled reactive phasor current value.

11. The apparatus of claim 10, wherein the current limiting techniques comprise one or more of maximum power point tracking (MPPT), economic optimization, charge control, advanced grid functions, or demand response, and wherein the charge threshold is equal to a maximum allowable apparent current based on hardware limitations of the power converter.

12. The apparatus of claim 9, wherein the droop control technique is a phase-shifted virtual voltage-virtual impedance droop technique, wherein the virtual AC voltage waveform is a sinusoidal waveform having a constant amplitude and a phase shifted from the frequency of the AC line by an amount proportional to the difference between a measured frequency of the AC line and a nominal frequency of the AC line.

13. The apparatus of claim 11, wherein:
if the magnitude of the apparent current is greater than the charge threshold, the controlled reactive phasor current value is set equal to the maximum allowable apparent current;
if the desired real phasor current value is greater than the real phasor current threshold, the controlled real phasor current value is set equal to the real phasor current threshold;
if the desired real phasor current value is less than the negative of the real phasor current threshold, the controlled real phasor current value is set equal to the negative of the real phasor current threshold;
if the magnitude of the apparent current is not greater than the charge threshold and the desired reactive phasor current value is greater than the reactive phasor current threshold, the controlled reactive phasor current value is set equal to the reactive phasor current threshold; and
if the magnitude of the apparent current is not greater than the charge threshold and the desired reactive phasor current value is less than the negative of the reactive phasor current threshold, the controlled reactive phasor current value is set equal to the negative of the reactive phasor current threshold.

14. The apparatus of claim 10, wherein the instantaneous current is controlled such that the power converter appears as the virtual AC voltage source when the power converter is grid-connected and when the power converter is islanded to enable a seamless transition between operating in a grid-connected state and operating in an islanded state.

15. A system for generating power, comprising:
an AC battery, comprising:
  an energy storage device; and
  a power converter that is bidirectional, coupled to an AC line and coupled to the energy storage device for storing energy when operating in a charge mode, wherein the power converter comprises a controller for controlling an instantaneous current generated by the power converter such that the power converter appears, from the perspective of the AC line coupled to the power converter, as a virtual AC voltage source in series with a virtual impedance, wherein real and reactive phasor currents for the power converter are indirectly controlled by modifying amplitude and phase of a virtual AC voltage waveform that defines the virtual AC voltage source.

16. The system of claim 15, wherein the instantaneous current is determined by:
  determining a desired real phasor current value and a desired reactive phasor current value by a droop control technique;
  generating a controlled real phasor current value based on a comparison between the desired real phasor current value and a real phasor current threshold;
  generating a controlled reactive phasor current value based on (a) a first comparison between the desired reactive phasor current value and a reactive phasor current threshold and (b) a comparison between a charge threshold and an apparent current based on the controlled real phasor current value and a result of the first comparison;
  computing the virtual AC voltage waveform based on the controlled real and reactive phasor current values; and
  determining an instantaneous current value for driving the power converter to emulate the virtual impedance in the time domain while generating an amount of real and reactive current equal to the controlled real and reactive phasor current values.

17. The system of claim 16, wherein the real and reactive phasor current thresholds are determined using one or more current limiting techniques, and wherein the apparent current is the magnitude of the vector sum of the controlled real phasor current value and the controlled reactive phasor current value.

18. The system of claim 17, wherein the current limiting techniques comprise one or more of maximum power point tracking (MPPT), economic optimization, charge control, advanced grid functions, or demand response, and wherein the charge threshold is equal to a maximum allowable apparent current based on hardware limitations of the power converter.

19. The system of claim 16, wherein the droop control technique is a phase-shifted virtual voltage-virtual impedance droop technique, wherein the virtual AC voltage waveform is a sinusoidal waveform having a constant amplitude and a phase shifted from the frequency of the AC line by an amount proportional to the difference between a measured frequency of the AC line and a nominal frequency of the AC line.

20. The system of claim 15, wherein the instantaneous current is controlled such that the power converter appears as the virtual AC voltage source when the power converter is grid-connected and when the power converter is islanded to enable a seamless transition between operating in a grid-connected state and operating in an islanded state.

* * * * *